(12) United States Patent
Hills

(10) Patent No.: US 8,269,107 B2
(45) Date of Patent: Sep. 18, 2012

(54) HALOGEN-FREE FLAME RETARDANT POLYOLEFIN

(75) Inventor: Charles W. Hills, Brownsburg, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 301 days.

(21) Appl. No.: 12/789,801

(22) Filed: May 28, 2010

(65) Prior Publication Data
US 2011/0290527 A1 Dec. 1, 2011

(51) Int. Cl.
*H01B 7/00* (2006.01)

(52) U.S. Cl. ............. 174/110 R; 174/119 R; 174/119 C

(58) Field of Classification Search ............... 174/110 R, 174/113 R, 119 R, 119 C, 36; 427/388.1–388.2
See application file for complete search history.

(56) References Cited

U.S. PATENT DOCUMENTS

| | | |
|---|---|---|
| 4,430,468 A | 2/1984 | Schumacher |
| 4,434,258 A | 2/1984 | Schumacher et al. |
| 4,673,620 A | 6/1987 | Shulman et al. |
| 4,701,359 A | 10/1987 | Akao |
| 4,948,669 A | 8/1990 | Rolland |
| 5,955,525 A | 9/1999 | Sanchez et al. |
| 6,329,454 B1 | 12/2001 | Krabbenborg |
| 6,376,623 B1 | 4/2002 | Hoenig et al. |
| 6,414,070 B1 | 7/2002 | Kausch et al. |
| 6,451,894 B1 | 9/2002 | Srinivasan et al. |
| 6,475,628 B2 | 11/2002 | Hase et al. |
| 2005/0137306 A1 | 6/2005 | Hausmann et al. |
| 2006/0058432 A1 * | 3/2006 | Perego et al. .................. 524/115 |

FOREIGN PATENT DOCUMENTS

| | | |
|---|---|---|
| EP | 1666527 A1 | 6/2006 |
| EP | 1882717 A1 | 1/2008 |
| WO | WO-00/66657 A1 | 11/2000 |
| WO | WO-00/68312 A1 | 11/2000 |

* cited by examiner

*Primary Examiner* — William Mayo, III
(74) *Attorney, Agent, or Firm* — Blank Rome LLP

(57) ABSTRACT

A halogen-free compositions containing an additive of bohmite, nanoclay, microcrystalline talc, zinc hydroxystannate, and a polyolefin oil. The composition is useful as a covering material (e.g. insulation or jacket) for electrical cables.

20 Claims, No Drawings

HALOGEN-FREE FLAME RETARDANT POLYOLEFIN

FIELD OF THE INVENTION

The present invention relates to halogen-free compositions containing an additive of bohmite, nanoclay, microcrystalline talc, zinc hydroxystannate, and a polyolefin oil. The composition is useful as a covering material for electrical cables with excellent flame resistance and mechanical properties, such as cold bend (UL 1072) and thermomechanical properties (ICEA S-94-649).

BACKGROUND OF THE INVENTION

Polyvinyl chloride (PVC) has been widely used as the covering material of electrical cable because of its superior mechanical strength, extrusion processability, flexibility, and coloring property. However, with recent concern for the global environment, halogen-free resin material has come to be used for covering electrical cables in place of PVC, because PVC discharges a harmful halogen gas on combustion.

Halogen-free resin compositions containing polymers are known in the art for use as electrical cable covering, while having the merit of no generation of a poisonous gas on combustion. Generally, those compositions are based on a polar polymer resin, typically ethylene vinyl acetate (EVA) copolymer, and a hydrated mineral filler. Aluminum trihydrate (ATH) is the most commonly used as a mineral filler and requires high levels, usually about 200-350 phr, to render the required fire performance. To achieve proper dispersion of such high filler loading, compatabilizers are needed, e.g. organosilane surface treatment of the filler or functionalized (e.g. maleic anhydride) polymers.

Metal hydroxides, such as magnesium hydroxide, can also be a substitute for ATH, but a large quantity of a metal hydroxide is also required. That causes problems in reduction of mechanical strength, such as wear resistance, tensile strength and the like. In order to prevent the deterioration of mechanical strength, it may be considered that amounts of a polypropylene having a comparatively high hardness and a high density polyethylene are increased, but the flexibility of the covered electrical wire is reduced thereby and the processability becomes poor.

Examples of halogen free compositions are disclosed in U.S. Pat. Nos. 4,948,669; 4,430,468; 4,434,258; 4,673,620; 4,701,359; and 6,475,628; and U.S. Patent Application Publication No. 2005/0137306.

Therefore, there remains a need for halogen-free compositions for use as a covering material for electrical cables with excellent flame resistance and mechanical properties.

SUMMARY OF THE INVENTION

An object of the present invention is to provide a halogen free composition, useful as a covering material for electrical cables, which is flame retardant and has excellent mechanical properties. The cable containing the covering material preferably passes the tray cable flame test specification of UL 1685 (2007) and IEEE 1202 (2006) and the thermomechanical specification of ICEA S-94-649 (2004). Additionally, the cable preferably also passes the cold bend test (UL 1072 (2007)) at or below −40° C., preferably at or below −50° C.

The composition of the present invention contains a base polyolefin and an additive containing bohmite, nanoclay, microcrystalline talc, zinc hydroxystannate, and a polyolefin oil. In an embodiment, the composition contains about 5-20 phr (by weight) bohmite, about 5-20 phr nanoclay, about 5-20 phr microcrystalline talc, about 5-20 phr zinc hydroxystannate, and about 2-4 phr polyolefin oil.

It is another object of the present invention to provide an additive for improving flame and mechanical properties of a base polymer. The additive contains bohmite, nanoclay, microcrystalline talc, zinc hydroxystannate, and a polyolefin oil. In an embodiment, the composition contains about 5-20 parts (by weight) bohmite, about 5-20 parts nanoclay, about 5-20 parts microcrystalline talc, about 5-20 parts zinc hydroxystannate, and about 2-4 parts polyolefin oil.

It is yet another object of the present invention to provide an electrical cable having superior flame and mechanical properties. The cable contains a conductor that is covered by the composition of the present invention. The cable preferably passes the tray cable flame test specification of either UL 1685 (2007) or IEEE 1202 (2006), and the thermomechanical specification of ICEA S-94-649 (2004). Additionally, the cable preferably also passes the cold bend test (UL 1072 (2007)) at or below about −40° C., preferably at or below about −50° C.

DETAILED DESCRIPTION OF THE PREFERRED EMBODIMENT

The composition of the present invention contains a polyolefin base polymer and an additive. Polyolefins, as used herein, are polymers produced from alkenes having the general formula $C_nH_{2n}$.

Within the broad definition above, non-limiting examples of polyolefins suitable for the present invention include polyethylene (including low-density (LDPE), high-density, high molecular weight (HDPE), ultra-high molecular weight (UHDPE), linear-low-density (LLDPE), very-low density, etc.), maleated polypropylene, polypropylene, polybutylene, polyhexalene, polyoctene, and copolymers thereof, and ethylene-vinyl-acetate (EVA) copolymer, and mixtures, blends or alloys thereof.

Metallocene-catalyzed olefin copolymers constitute another polymer in the polymer alloy of the present invention. Those copolymers are included in the alloy to provide a modification of the modulus of the polyolefin and to otherwise assist in the processability of the polyolefins during manufacture.

Such metallocene-catalyzed olefin copolymers are well known in the art, such as disclosed in U.S. Pat. Nos. 6,451,894; 6,376,623; and 6,329,454. Such copolymers are available from a number of commercial sources, among them being ExxonMobil and Dow Elastomers.

It is well known that metallocene catalysis can yield quite precise polymeric structures. Within the possibilities of olefin monomers used in the copolymerization, it is preferred to use ethylene with a second olefin monomer having from 3 to 18 carbon atoms. Of the comonomer choices, octene is preferred because of the variation possible in melt flow properties of the resulting copolymer.

The base polymer utilized in the covering composition (e.g. insulation or jacket) for electric cables in accordance with the invention may also be selected from the group of polymers consisting of ethylene polymerized with at least one comonomer selected from the group consisting of $C_3$ to $C_{20}$ alpha-olefins and $C_3$ to $C_{20}$ polyenes. Generally, the alpha-olefins suitable for use in the invention contain in the range of about 3 to about 20 carbon atoms. Preferably, the alpha-olefins contain in the range of about 3 to about 16 carbon atoms, most preferably in the range of about 3 to about 8 carbon atoms. Illustrative non-limiting examples of such alpha-olefins are propylene, 1-butene, 1-pentene, 1-hexene, 1-octene and 1-dodecene.

Preferably, the polymers utilized in the cables of the invention are either ethylene/alpha-olefin copolymers or ethylene/alpha-olefin/diene terpolymers. The polyene utilized in the invention generally has about 3 to about 20 carbon atoms. Preferably, the polyene has in the range of about 4 to about 20 carbon atoms, most preferably in the range of about 4 to about 15 carbon atoms. Preferably, the polyene is a diene, which can be a straight chain, branched chain, or cyclic hydrocarbon diene. Most preferably, the diene is a non conjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2morbornene (MNB), 5-propenyl-2-norbornene, 5-isopropylidene-2-norbornene, 5-(4-cyclopentenyl)-2-norbornene, 5-cyclohexylidene-2-norbornene, and norbornene. Of the dienes typically used to prepare EPRs, the particularly preferred dienes are 1,4-hexadiene, 5-ethylidene-2-norbornene, 5-vinyllidene-2-norbornene, 5-methylene-2-norbornene and dicyclopentadiene. The especially preferred dienes are 5-ethylidene-2-norbornene and 1,4-hexadiene.

As an additional polymer in the base polymer composition, a non-metallocene base polymer may be used having the structural formula of any of the polyolefins or polyolefin copolymers described above. Ethylene-propylene rubber (EPR), polyethylene, polypropylene or ethylene vinyl acetates having a range of vinyl acetate content of from about 10% to about 40% may all be used in combination with the other polymers in the base polymer to give other desired properties in the base polymer. As stated above, however, combinations of factors such as cost and availability of raw materials, and end user requirements for certain environments may dictate certain compositions or cause certain embodiments to be preferred in certain circumstances which under other circumstances they might not be.

The preferred base polymer is ethylene-octene, LDPE, LLDPE, EVA, EPR, or EPDM.

The additive of the present invention contains bohmite, nanoclay, microcrystalline talc, zinc hydroxystannate, and a polyolefin oil. Bohmite is an aluminum oxide hydroxide (AlO(OH)) mineral, which is a major component of bauxites, laterites, or fireclays. It is dimorphous with diaspore and crystallizes in the orthorhombic dipyramidal system. In the present composition, bohmite is present at about 5-20 phr, preferably about 5-15 phr, and more preferably about 10 phr.

Nanoclay is a clay from the smectite family which has a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Nanoclay becomes commercially significant if intercalated with an intercalant. An intercalate is a clay-chemical complex wherein the clay gallery spacing has increased, due to the process of surface modification by an intercalant. Under the proper conditions of temperature and shear, an intercalate is capable of exfoliating in a resin matrix. An intercalant is an organic or semi-organic chemical capable of entering the montmorillonite clay gallery and bonding to the surface. Exfoliation describes a dispersion of a surface treated nanoclay in a plastic matrix.

In exfoliated form, nanoclay platelets have a flexible sheet-type structure which is remarkable for its very small size, especially the thickness of the sheet. The length and breadth of the particles range from 1.5 µm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites are the combination of the surface treated nanoclay and the plastic matrix. In polymer compounding, a nanocomposite is a very convenient means of delivery of the nanoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com), PolyOne Corporation of Avon Lake, Ohio (www.polyone.com), and Rockwood Additives (Southern Clay) (www.scprod.com) in a variety of compositions.

Other nanoclays that are suitable for use in the present invention are identified in U.S. Pat. No. 6,414,070 (Kausch et al.) and PCT Patent Publications WO 00/66657 and WO 00/68312. In the present composition, nanoclay is present at about 5-20 phr, preferably about 5-15 phr, and more preferably about 10 phr.

Talc is a hydrated magnesium sheet silicate having the chemical formula $Mg_3Si_4O_{10}(OH)_2$. Its elementary sheet is composed of a layer of magnesium-oxygen/hydroxyl octahedra, sandwiched between two layers of silicon-oxygen tetrahedral. There are two talc morphologies: macrocrystalline talc characterized by large individual platelets; and microcrystalline characterized by much smaller platelets. Because talc is a flaky material, the difference between micro- and macrocrystalline talc is in their aspect ratio. Microcrystalline talc has an aspect ratio up to 20; macrocrystalline talc, has an aspect ratio of 20 or higher. The preferred particle size of the microcrystalline talc is between 3 and 5 microns, more preferably 3.8 microns. In the present composition, microcrystalline talc is present at about 5-20 phr, preferably about 10-20 phr, and more preferably about 20 phr.

Zinc hydroxystannate has the chemical formula $ZnSnO_3 \cdot 3H_2O$ and is widely available from various suppliers. In the present composition, it is present at about 5-20 phr, preferably about 5-15 phr, and more preferably about 10 phr.

Many polyolefin oils are useful for the present invention. Although both are polyolefins, as used herein, the polyolefin oil is distinguished from the base polymer by its density: the density of the polyolefin oil is about 0.830 g/cm$^3$ or less, while the density of the base polyolefin polymer is about 0.890 g/cm$^3$ or greater. It is preferred however, that the polyolefin oil is non-polar and non-conductive. Additionally, preferred characteristics of the polyolefin oil include: viscosity of about 60-90 cP at 20° C., more preferably about 74 cP; mean molecular weight of about 570-610 g/mol, more preferably about 590 g/mol; and density of about 0.826-0.830 g/cm$^3$, more preferably about 0.828 g/cm$^3$. In the present composition, polyolefin oil is present at about 0.1-4 phr, preferably about 2-4 phr, more preferably about 2 phr.

Optionally, the compositions of the present invention can also include a hydrated mineral, such as magnesium hydroxide or ATH. The hydrate mineral, if used, should be about 150-220 phr, preferably about 180-200 phr, more preferably about 185-195 phr. Additionally, a compatabilizer, as known in the art, should be used with the hydrated mineral.

The compositions of the invention can be prepared by blending the base polyolefin polymer and additives by use of conventional masticating equipment, for example, a rubber mill, Brabender Mixer, Banbury Mixer, Buss-Ko Kneader, Farrel continuous mixer or twin screw continuous mixer. The additives are preferably premixed before addition to the base polyolefin polymer. Mixing times should be sufficient to obtain homogeneous blends. All of the components of the compositions utilized in the invention are usually blended or compounded together prior to their introduction into an extrusion device from which they are to be extruded onto an electrical conductor.

After the various components of the composition are uniformly admixed and blended together, they are further processed to fabricate the cables of the invention. Prior art methods for fabricating polymer cable insulation or cable jacket are well known, and fabrication of the cable of the invention may generally be accomplished by any of the various extrusion methods.

In a typical extrusion method, an optionally heated conducting core to be coated is pulled through a heated extrusion die, generally a cross-head die, in which a layer of melted polymer is applied to the conducting core. Upon exiting the die, if the polymer is adapted as a thermoset composition, the conducting core with the applied polymer layer may be passed through a heated vulcanizing section, or continuous vulcanizing section and then a cooling section, generally an elongated cooling bath, to cool. Multiple polymer layers may be applied by consecutive extrusion steps in which an additional layer is added in each step, or with the proper type of die, multiple polymer layers may be applied simultaneously.

The conductor of the invention may generally comprise any suitable electrically conducting material, although generally electrically conducting metals are utilized. Preferably, the metals utilized are copper or aluminum. In power transmission, aluminum conductor/steel reinforcement (ACSR) cable, aluminum conductor/aluminum reinforcement (ACAR) cable, or aluminum cable is generally preferred.

Without further description, it is believed that one of ordinary skill in the art can, using the preceding description and the following illustrative example, make and utilize the compounds of the present invention and practice the claimed methods. The following example is given to illustrate the present invention. It should be understood that the invention is not to be limited to the specific conditions or details described in this example.

EXAMPLE

Table 1 compares several different cable jackets to that of the present invention.

|  | Cable Samples | | | | Specification |
| --- | --- | --- | --- | --- | --- |
|  | DFDE 1638 (extruded tape) | LJ750C (1/0 tape shield) | LJ750D (1/0 tape shield) | LJ750G (1/0 tape shield) | of the most rigorous requirement |
| Tensile (PSI) | 1647 | 2279 | 1726 | 1727 | >1400 |
| % Elongation | 208 | 184 | 225 | 171 | >100 |
| Tear @ room temperature (lb force/in) | 45.7 | 50 | 40 | 54 | >35 |
| Cold Bend | Pass (@ −25° C.) | Pass (@ −25° C.) | Pass (@ −35° C.) | Pass (@−55° C.) | Pass (−25° C.) |
| Smoke Index | 13.93 | 30.37 | Not Completed | 22.17 | <25 |
| Thermomechanical (130° C. peak) | Fail | Fail | Pass | Pass | Pass |
| Tray Cable Flame Test | Fail | Fail | Fail | Pass | IEEE 1202 |
| Char Height |  | Full Tray | Full Tray | 1.25 m | 1.5 m |
| Smoke Release (Peak Rate) |  |  |  | 50.3 (0.19) | 150 (0.4) |

DFDE 1638 is a commercially available halogen-free polyolefin jacket material from Dow Chemicals.
LJ750C is a polyolefin jacket material containing ATH (180 phr) and microcrystalline talc (20 phr).
LJ750D is a polyolefin jacket material containing ATH (180 phr), bohmite (10 phr), nanoclay (10 phr), and microcrystalline talc (20 phr).
LJ750G is a polyolefin jacket material containing ATH (180 phr), bohmite (10 phr), nanoclay (10 phr), microcrystalline talc (20 phr), zinc hydroxystannate (10 phr), and a polyolefin oil (2 phr).

The cold bend test was performed in accordance with UL 1072 (2007) section 38. The thermomechanical test was performed in accordance with ICEA S-94-649 (2004). The tray flame cable test was performed in accordance with UL1685 (2007) and IEEE1202 (2006).

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A cable having a conductor and a covering, said covering comprising a base polymer and an additive, wherein the additive contains bohmite, nanoclay, microcrystalline talc, zinc hydroxystannate, and a polyolefin oil.

2. An additive for improving mechanical and flame resistant properties of polyolefins comprising bohmite, nanoclay, microcrystalline talc, zinc hydroxystannate, and a polyolefin oil.

3. The additive of claim 2, wherein the polyolefin oil has a viscosity of about 60-90 cP at 20° C.

4. The additive of claim 2, wherein the polyolefin oil has a molecular weight of about 570-310 g/mol.

5. The additive of claim 2, wherein the polyolefin oil has a density of about 0.826-0.830 g/cm$^3$.

6. The additive of claim 2, wherein the nanoclay is montmorillonite clay.

7. The additive of claim 2, containing about 5-20 parts (by weight) bohmite, about 5-20 parts nanoclay, about 5-20 parts microcrystalline talc, about 5-20 parts zinc hydroxystannate, and about 2-4 parts polyolefin oil.

8. A composition comprising a base polymer and an additive, wherein the additive contains bohmite, nanoclay, microcrystalline talc, zinc hydroxystannate, and a polyolefin oil.

9. The composition of claim 8, wherein the polyolefin oil has a viscosity of 60-90 cP at 20° C.

10. The composition of claim 8, wherein the polyolefin oil has a molecular weight of about 570-310 g/mol.

11. The composition of claim 8, wherein the polyolefin oil has a density of about 0.826-0.830 g/cm$^3$.

12. The composition of claim 8, wherein the nanoclay is montmorillonite clay.

13. The composition of claim 8, containing about 5-20 phr (by weight) bohmite.

14. The composition of claim 8, containing about 5-20 phr nanoclay.

15. The composition of claim 8, containing about 5-20 phr microcrystalline talc.

16. The composition of claim 8, containing about 5-20 phr zinc hydroxystannate.

17. The composition of claim 8, containing about 2-4 phr polyolefin oil.

18. The composition of claim 8, wherein the base polymer is an olefin.

19. The cable of claim 18, wherein the polyolefin oil has a viscosity of 60-90 cP at 20° C.

20. The cable of claim 18, wherein the polyolefin oil has a molecular weight of about 570-310 g/mol.

\* \* \* \* \*

UNITED STATES PATENT AND TRADEMARK OFFICE
CERTIFICATE OF CORRECTION

PATENT NO. : 8,269,107 B2  
APPLICATION NO. : 12/789801  
DATED : September 18, 2012  
INVENTOR(S) : Charles W. Hills Page 1 of 1

It is certified that error appears in the above-identified patent and that said Letters Patent is hereby corrected as shown below:

In the Claims  
Claim 4, column 7, line 4, change "570-310 g/mol" to --570-610 g/mol--;  
Claim 10, column 7, line 19, change "570-310 g/mol" to --570-610 g/mol--; and  
Claim 20, column 8, line 18, change "570-310 g/mol" to --570-610 g/mol--.

Signed and Sealed this  
Fourteenth Day of June, 2016

Michelle K. Lee  
*Director of the United States Patent and Trademark Office*